(12) United States Patent
Krizhevsky et al.

(10) Patent No.: US 11,928,577 B2
(45) Date of Patent: *Mar. 12, 2024

(54) SYSTEM AND METHOD FOR PARALLELIZING CONVOLUTIONAL NEURAL NETWORKS

(71) Applicant: Google LLC, Mountain View, CA (US)

(72) Inventors: Alexander Krizhevsky, Mountain View, CA (US); Ilya Sutskever, San Francisco, CA (US); Geoffrey E. Hinton, Toronto (CA)

(73) Assignee: Google LLC, Mountain View, CA (US)

( * ) Notice: Subject to any disclaimer, the term of this patent is extended or adjusted under 35 U.S.C. 154(b) by 928 days.

This patent is subject to a terminal disclaimer.

(21) Appl. No.: 16/859,815

(22) Filed: Apr. 27, 2020

(65) Prior Publication Data

US 2020/0327391 A1    Oct. 15, 2020

Related U.S. Application Data

(63) Continuation of application No. 15/414,514, filed on Jan. 24, 2017, now Pat. No. 10,635,966, which is a
(Continued)

(51) Int. Cl.
| | | |
|---|---|---|
| *G06N 3/04* | (2023.01) | |
| *G06F 18/214* | (2023.01) | |
| *G06N 3/045* | (2023.01) | |
| *G06N 3/063* | (2023.01) | |
| *G06N 3/08* | (2023.01) | |
| *G06T 1/20* | (2006.01) | |
| *G06V 10/44* | (2022.01) | |

(52) U.S. Cl.
CPC .......... *G06N 3/063* (2013.01); *G06F 18/214* (2023.01); *G06N 3/04* (2013.01); *G06N 3/045* (2023.01); *G06N 3/08* (2013.01); *G06T 1/20* (2013.01); *G06V 10/454* (2022.01)

(58) Field of Classification Search
None
See application file for complete search history.

(56) References Cited

U.S. PATENT DOCUMENTS

| | | |
|---|---|---|
| 5,740,326 A | 4/1998 | Boulet et al. |
| 6,820,070 B2 | 11/2004 | Goldman et al. |

(Continued)

FOREIGN PATENT DOCUMENTS

| | | |
|---|---|---|
| TW | 226454 | 7/1994 |
| TW | 1235935 | 7/2005 |

OTHER PUBLICATIONS

Chen et al., "Pipelined back-propagation for context-dependent deep neural networks," Proceedings of the 13th Annual Conference of the International Speech Communication Association (Interspeech'2012), Sep. 9, 2012, 26-29.

(Continued)

*Primary Examiner* — David R Vincent
(74) *Attorney, Agent, or Firm* — Fish & Richardson P.C.

(57) ABSTRACT

A parallel convolutional neural network is provided. The CNN is implemented by a plurality of convolutional neural networks each on a respective processing node. Each CNN has a plurality of layers. A subset of the layers are interconnected between processing nodes such that activations are fed forward across nodes. The remaining subset is not so interconnected.

20 Claims, 4 Drawing Sheets

Related U.S. Application Data continuation of application No. 14/817,492, filed on Aug. 4, 2015, now Pat. No. 9,563,840, which is a continuation of application No. 14/030,938, filed on Sep. 18, 2013, now Pat. No. 9,811,775.

(60) Provisional application No. 61/745,717, filed on Dec. 24, 2012.

(56) References Cited

U.S. PATENT DOCUMENTS

| | | | |
|---|---|---|---|
| 2003/0236760 | A1 | 12/2003 | Nugent |
| 2011/0255741 | A1* | 10/2011 | Jung .................. G06V 20/58 382/103 |
| 2012/0203932 | A1* | 8/2012 | da Costa ............... H04L 67/10 709/248 |
| 2012/0275690 | A1* | 11/2012 | Melvin .................. G06V 10/95 382/156 |
| 2014/0180989 | A1 | 6/2014 | Krizhevsky et al. |
| 2015/0339571 | A1 | 11/2015 | Krizhevsky et al. |

OTHER PUBLICATIONS

Ciresan et al., "Multi-column deep neural networks for image classification," Proceedings 0f the 2012 IEEE Conference on Computer Vision and Pattern Recognition (CVPR'12). Jun. 16, 2012, 3642-3649.

Dean et al., "Large Scale Distributed Deep Networks," Proceedings of the 26th annual conference on Neural Information Processing Systems (NIPS'2012), Dec. 3, 2012, Retrieved from the Internet: URL:http://books.nips.cc/papers/files/nips25/NIPS2012_0598.pdf [retrieved on Apr. 7, 2012].

International Search Report and Written Opinion in International Application No. PCT/US2013/077606, dated Apr. 22, 2014, 11 pages.

Krizhevsky et al., "ImageNet classification with deep Convolutional neural networks," Proceedings of the 26th annual conference on Neural Information Processing Systems (NIPS'2012), Dec. 3, 2012, Retrieved from the Internet: URL:http://books.nips.cc/papers/files/nips25/NIPS2012_0534.pdf, [retrieved on;Apr. 7, 2014].

Office Action issued in Taiwanese Application No. 102147804, dated Feb. 13, 2017, 10 pages ( with English translation).

\* cited by examiner

SYSTEM AND METHOD FOR PARALLELIZING CONVOLUTIONAL NEURAL NETWORKS

CROSS-REFERENCE TO RELATED APPLICATIONS

This is a continuation of U.S. application Ser. No. 15/414,514, filed on Jan. 24, 2017, which is a continuation of U.S. application Ser. No. 14/817,492, filed on Aug. 4, 2015 (now U.S. Pat. No. 9,563,840), which is a continuation of U.S. application Ser. No. 14/030,938, filed on Sep. 18, 2013 (now U.S. Pat. No. 9,811,775), which claims the benefit of priority under 35 U.S.C. § 119(e) of U.S. Provisional Application No. 61/745,717, filed on Dec. 24, 2012. The disclosures of the prior applications are considered part of and are incorporated by reference in the disclosure of this application.

TECHNICAL FIELD

The following relates generally to convolutional neural networks and more specifically to a parallel convolutional neural network.

BACKGROUND

Convolutional neural networks (CNNs) are powerful models that can be configured to be well suited for computer vision problems. CNNs typically perform best when they are large (i.e., more complex), meaning that they have more, deeper and highly-interconnected layers. A primary drawback of these CNNs is computational cost. Thus, large CNNs are typically impractically slow. In many applications, a large CNN demands more computation than is currently available on a serial computer.

Complex CNNs can, therefore, be implemented by parallelizing the network across multiple processors. For example, for image processing or classification tasks, a CNN could be implemented on several graphics processing units (GPUs).

There have been various proposals to increase the practicality of CNNs by means of parallelizing the CNN across several processors. Such approaches partition the network into parallel subnetworks in such a way as to minimize communication cost.

A first approach naively partitions the network into parallel subnetworks and communicates the state of every subnetwork's layer to all other subnetworks. This approach may be applied to both CNNs and fully connected networks.

In this approach, the network is partitioned into some number of parallel subnetworks in some manner. The subnetworks communicate their activations to all other subnetworks at every layer, which results in a parallel implementation of the feedforward neural network.

In certain implementations, however, this approach is inefficient with CNNs. Its efficiency is best for fully connected weight matrices because the amount of computation required by such matrices causes the communication-to-computation ratio to be small.

In contrast, CNN weight matrices are much sparser, so their communication-to-computation ratio is much larger. As a result, when applying this approach to CNNs, a large fraction of time is spent on communication, which makes the parallelization less useful.

A second approach partitions the network into slices that communicate with their neighbors, and is commonly only applied to convolutional or to locally connected networks. However, current implementations of this approach typically handle pooling inefficiently. Pooling is a technique for making the network's activations more invariant to small translations. While pooling increases the accuracy of the CNN, it changes the dimensions of the activation tensor in such a way that typically allows for less parallelism and requires increased communication for the second approach.

For example, one particular implementation of the second approach parallelizes CNNs into slices that communicate only with their neighbours. The approach partitions the input tensor (of size $N \times N \times u$) into m subtensors of size $(N/m) \times N \times u$ and allocates a computing node to each of the m subtensors. This is efficient only when N is large and u is small, because a large N allows m, and thus the number of computing nodes, to be large, and a small u allows the neighbouring slices to not communicate much. However, when pooling is used, N is necessarily small and u is necessarily large. Since m cannot exceed N, a small N restricts the number of computing nodes which limits the attainable acceleration, while a large u requires more communication between neighbouring slices which increases the communicaiton cost.

It is an object of the following to obviate or mitigate at least one of the foregoing issues.

SUMMARY

In one aspect, a parallel convolutional neural network is provided, the parallel convolutional neural network comprising a plurality of convolutional neural networks each implemented on a respective processing node and each comprising a plurality of layers, a subset of said layers being interconnected between said processing nodes to feed forward respective activations and a remaining subset not being so interconnected.

In another aspect, a method for establishing a parallel convolutional neural network is provided.

DESRIPTION OF THE DRAWINGS

The features of the invention will become more apparent in the following detailed description in which reference is made to the appended drawings wherein.

DETAILED DESCRIPTION

Figure 1:
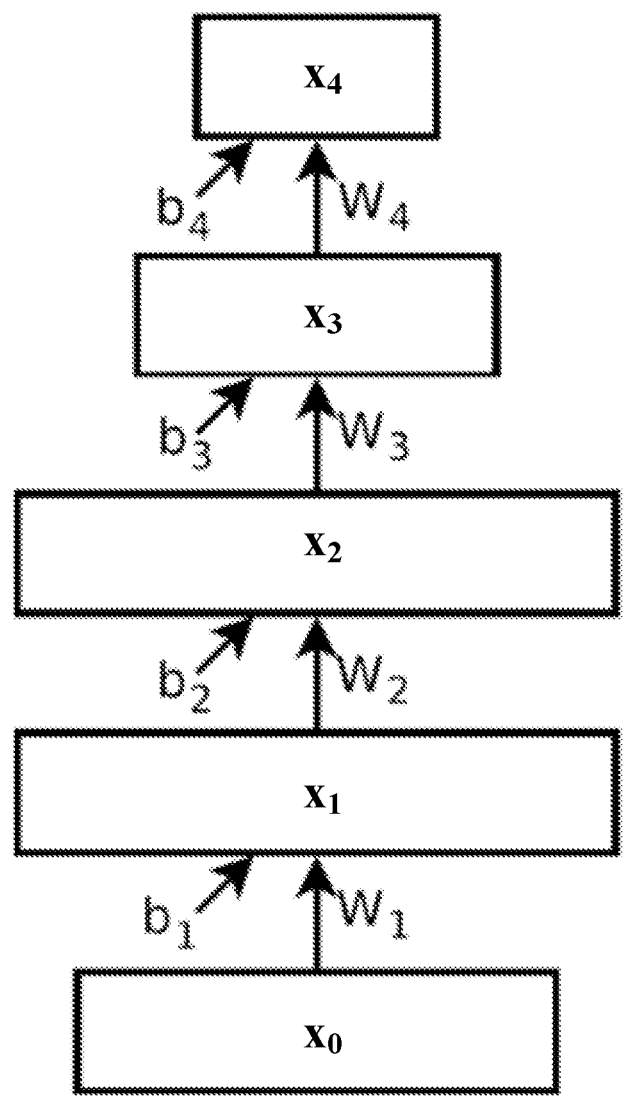
FIG. 1 is a four-layer feedforward neural network.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

The following describes a system and method for parallelizing a neural network in which a parallel neural network comprises a plurality of neural networks that communicate to other ones of the neural networks a subset of their state conditions. Thus, communications cost is relatively low compared to a fully connected parallel neural network, while maintaining suitable ability to benefit from parallel computation. Pooling is also enabled under the described system and method.

The following describes the parallelization of a CNN, however it is to be understood that the following principles apply to neural networks generally.

Referring first to FIG. 1, a feedforward neural network (FNN) comprises a plurality of layers, each of which comprises a pluralirty of cells. In various implementations, the network, the layers and/or the cells are each implemented by a processor.

An FNN is a family of functions that map $\mathbb{R}^n$ to $\mathbb{R}^m$ which is parameterized with a sequence of weight matrices $(W_1, \ldots, W_\ell)$ and a sequence of bias vectors $(b_1, \ldots, b_\ell)$. Given an input $x \in \mathbb{R}^n$, the network's output $x_\ell$ can be computed by $x_i \leftarrow f_i(W_i x_{i-1} + b_i)$ by iterating i from 1 to $\ell$, where $x_0 \leftarrow x$, $x_i$ is the activation vector (or state) of the i-th layer, and $f_i(\bullet)$ is an easy to compute nonlinearity, such as the element-wise tanh or the element-wise rectification max(0, x).

Every configuration of weights and biases $(W_1, \ldots, W_\ell)$ and $(b_1, \ldots, b_\ell)$ defines a different $x_0 \to x_\ell$ mapping. Training the network comprises applying nonlinear optimization methods to find a parameter setting whose mapping $x_0 \to x_\ell$ produces correct labels on the training set. An FNN is said to be fully-connected when each of the $W_i$ matrices is dense.

Neural networks can, in principle, be applied to vision tasks if the input image is encoded as a vector. However, even small images are extremely high-dimensional objects. For example, a 256×256 color image has 196608 dimensions. This high dimensionality typically renders neural networks infeasible to apply in practice, because their weight matrices tend to be impractically large. For instance, a dense square matrix of the above dimensions has almost $5 \cdot 10^{10}$ parameters, which requires more computation than is typically available on a single CPU. It also typically requires an infeasible amount of data for learning.

A CNN, however, typically requires much less computation and training data than a fully-connected neural network with similarly-sized layers, while being capable of achieving similar performance on tasks such as vision (provided there are no limits on the amount of data and computation). The CNN has a restricted connectivity, so each neuron is only connected to a small patch of the input image as opposed to the entire image, which subsequently reduces the number of connections. This restriction does not hurt performance relative to a fully-connected network, because weighted sums of spatially-separated pixels are not informative. In addition, the CNN uses weight sharing, which means that it processes every image patch with the same connections. This results in an additional reduction in the number of parameters, which greatly reduces the amount of necessary training data. This weight sharing does not hurt performance relative to networks that do not use such sharing, because image statistics are homogeneous, so images can be reasonably processed in the same manner in every locations.

Stated more formally, the input 1 to a CNN weight matrix may be a stack of u images of size N×N each, which is a tensor of size N×N×u. A single CNN layer may apply u×v filters, each of size (2m+1)×(2m+1), to produce an output tensor (activation tensor) 0 of size (N−2m)×(N−2m)×v. The output tensor may be computed with the following formula for each i, j, and v':

$$O_{i,j,v'} = \sum_{x=-m}^{m} \sum_{y=-m}^{m} \sum_{u'=0}^{u} I_{i'+x, j'+y, u'} W_{x,y,u',v'}$$

where i'=i+m+1 and j'=j+m+1.

Thus, while a fully connected network with identically-sized layers has $N^2 u \times (N-2m)^2 v$ connections, a convolutional neural networks has $(N-2m)^2 u \times (2m+1)^2 v$ connections and only $u \times v \times (2m+1)^2$ parameters, so the number of connections is reduced by a factor of about $N^2/4m^2$ and the number of parameters is reduced by a factor of almost $N^4/4m^2$.

However, despite the relative efficiency of a reasonably-sized convolutional neural network, in practice it may be impracticably slow for classification of large images.

Figure 2:
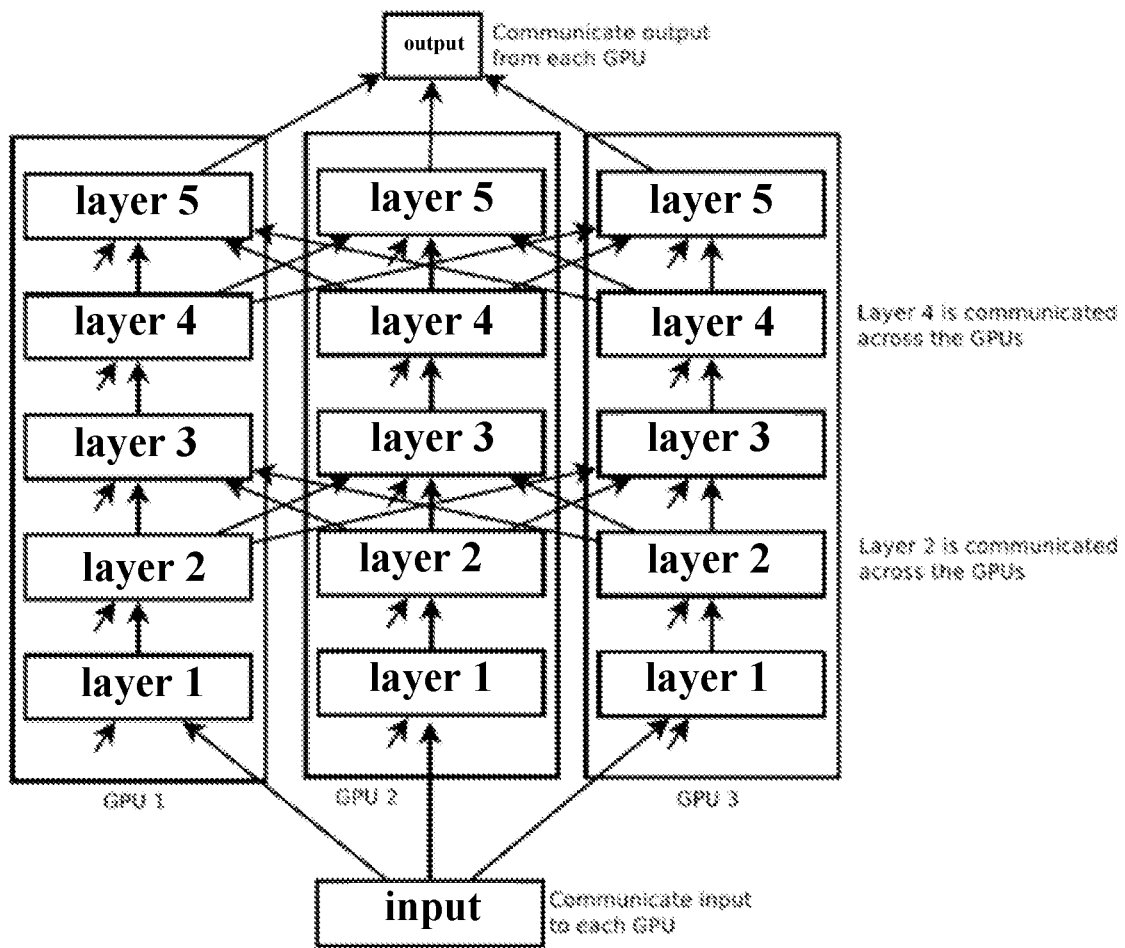
FIG. 2 is a parallel convolutional neural network.

Referring now to FIG. 2, in one aspect, a system for parallelizing a CNN is provided. The system comprises a plurality of CNNs instantiated on a plurality of computing nodes. Each computing node is a processor such as a CPUs or GPUs. It will be appreciated that a set of nodes may comprise combinations of CPUs and GPUs as well as other processors. It will also be appreciated that the described CNN need not be applied only to image processing, but can be applied to other suitable tasks.

In one aspect, the system comprises interconnections initiated at a predetermined subset of layers for which activations will be communicated to other CNNs. The activations may be communicated to the subsequent adjacent layer of the other CNNs. For example, activations of nodes at layer i are communicated to cells of layer i+1 in other nodes. In the example shown in FIG. 2, for example, activations of layer 2 and 4 in each node are communicated to layer 3 and 5, respectively, of the other nodes.

The layers selected for interconnection are a subset of all layers. In an example, which is to be understood as non-limiting, activations may be communicated across all nodes of particular pair of adjacent layers at predetermined intervals (i.e., nodes of layer xi+k are communicated to nodes of layer xi+k+1, where x is an integer and k is an offset constant to define the first such interconnected layer). In a specific example, the selected layers are every third or fourth layer (i.e., x=3 or 4). In another example, the interval of such layers is irregular, such that the layers whose activations are to be communicated are selected arbitrarily, or selected based on additional considerations.

In another aspect, activations of a particular node may be communicated to a subset of the other nodes. For example, when the number of computing nodes is large, such as being greater than 10 for example, the cost of communicating the activation of every CNN at the predetermined layers to each other CNN at the respective subsequent layers may be impractically or prohibitively expensive. In such a case, the activations may be communicated to a predetermined subset (that may be selected randomly or in some other way prior to training) of the other CNNs. In an example, activations for node 1 layer 1 may be interconnected to node 2 layer 2 but not node 3 layer 2.

In yet another aspect, activations of nodes of a particular layer may be interconnected with the subsequent layers of other CNNs while nodes in the corresponding layer of the other CNNs are not interconnected with the subsequent layers of other CNNs. In an example, node 1 layer 1 may be interconnected to node 2 layer 2 and node 3 layer 2, while node 2 layer 1 may only be connected to node 2 layer 2 and not interconnected to node 1 layer 2 or node 3 layer 2. In another example, layer 1 of both nodes 1 and 2 may be interconnected with layer 2 of each node, while layer 1 of node 3 may only be connected to node 3 layer 2.

Combinations of the foregoing are also possible. For example, node 1 layer 1 may be interconnected to node 2 layer 2 but not node 3 layer 2; while node 2 layer 1 may not be interconnected to either node 1 layer 2 or node 3 layer 2; and node 3 layer 1 may be interconnected to both node 1 layer 2 and node 2 layer 2.

Such examples may be beneficial where, for example, one or more node (one or more of the GPUs) is slower than others. In this example, it may be beneficial to reduce the size of each layer at the slower nodes relative to that layer at the other nodes to enable all the GPUs to process each layer at roughly the same speed. In turn, the smaller layer size of said GPU may make it cheap to communicate at every layer, without greatly increasing communication cost. It may thus be cost-effective to communicate the activations of the slower GPU at every layer, while communicating the activations of the faster GPUs at only some of the layers.

Figure 3:
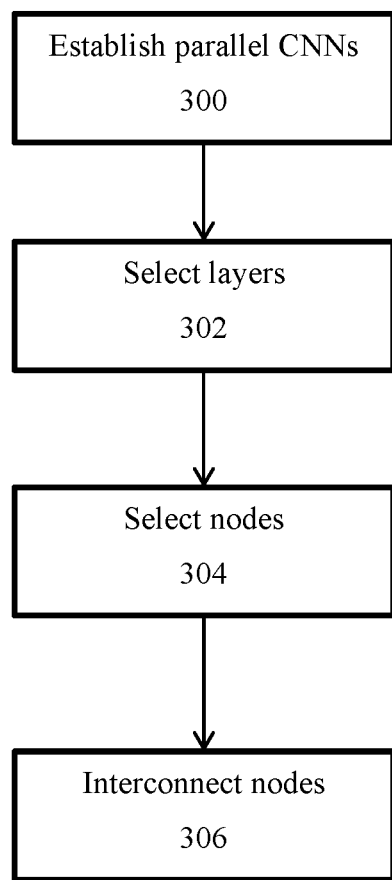
FIG. 3 is a flowchart depicting a method of establishing a parallel convolutional neural network.

Referring to FIG. 3, a method of establishing a parallel CNN may comprise establishing a plurality of parallel CNNs each instantiated on a computing node (300), selecting one or more layers for each CNN for which to communicate their activations to other CNNs (302), selecting, for each such layer in each such CNN, at least a subset of the other CNNs to which to communicate the activations (304), and interconnecting each of the selected layers with the respective subsequent layers of such subset (308).

Figure 4:
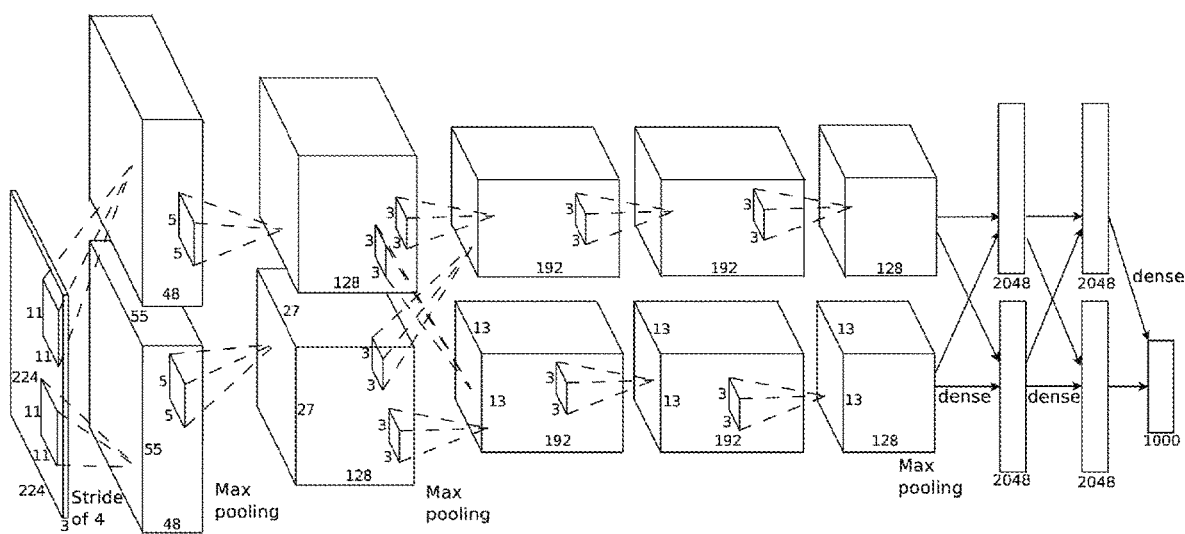
FIG. 4 is a neural network comprising a parallel convolutional neural network.

Referring to FIG. 4, a neural network comprising another example of a parallel CNN implemented on two nodes is shown. In this example, the neural network comprises eight layers where the first five are convolutional and the remaining three are fully-connected. The second, fourth and fifth convolutional layers are connected to the previous layer only within the same processor, while those of the remaining layers are interconnected across the two nodes.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A system comprising one or more computers and one or more storage devices storing instructions that when executed by the one or more computers cause the one or more computers to implement a convolutional neural network, the convolutional neural network comprising:
   a first convolutional layer configured to receive an input image and to process the input image to generate a first convolved output;
   a first max-pooling operation immediately after the first convolutional layer in the convolutional neural network and configured to pool the first convolved output to generate a first pooled output;
   a sequence having only a plurality of second convolutional layers that is after the max-pooling layer in the convolutional neural network and that is configured to receive a first input derived from the first pooled output and to process the first input to generate a second convolved output;
   one or more fully-connected layers after the sequence of second convolutional layers in the convolutional neural network and configured to receive an output derived from the second convolved output and to collectively process the output derived from the second convolved output to generate an initial output for the input image; and
   an output layer configured to classify the input image based at least in part on the initial output.

2. The system of claim 1, wherein the one or more fully-connected layers are not immediately after the sequence of second convolutional layers in the convolutional neural network.

3. The system of claim 1, wherein the sequence of second convolutional layers is not immediately followed by a max-pooling layer in the convolutional neural network.

4. The system of claim 1, wherein the convolutional neural network comprises one or more other layers between the sequence of second convolutional layers and the plurality of fully-connected layers.

5. The system of claim 1, wherein the convolutional neural network comprises one or more sets of two or more convolutional neural network layers that each receive a respective same input.

6. The system of claim 1, the convolutional neural network further comprising:
   one or more additional sequences of neural network layers.

7. The system of claim 6, wherein each additional sequence of neural network layers is configured to collectively process an input derived from the input image to generate a respective initial output for the input image.

8. One or more non-transitory computer-readable storage media storing instructions that when executed by one or more computers cause the one or more computers to implement a convolutional neural network, the convolutional neural network comprising:
   a first convolutional layer configured to receive an input image and to process the input image to generate a first convolved output;
   a first max-pooling operation immediately after the first convolutional layer in the convolutional neural network and configured to pool the first convolved output to generate a first pooled output;

a sequence having only a plurality of second convolutional layers that is after the max-pooling layer in the convolutional neural network and that is configured to receive a first input derived from the first pooled output and to process the first input to generate a second convolved output;

one or more fully-connected layers after the sequence of second convolutional layers in the convolutional neural network and configured to receive an output derived from the second convolved output and to collectively process the output derived from the second convolved output to generate an initial output for the input image; and an output layer configured to classify the input image based at least in part on the initial output.

9. The computer-readable storage media of claim 8, wherein the one or more fully-connected layers are not immediately after the sequence of second convolutional layers in the convolutional neural network.

10. The computer-readable storage media of claim 8, wherein the sequence of second convolutional layers is not immediately followed by a max-pooling layer in the convolutional neural network.

11. The computer-readable storage media of claim 8, wherein the convolutional neural network comprises one or more other layers between the sequence of second convolutional layers and the plurality of fully-connected layers.

12. The computer-readable storage media of claim 8, wherein the convolutional neural network comprises one or more sets of two or more convolutional neural network layers that each receive a respective same input.

13. The computer-readable storage media of claim 8, the convolutional neural network further comprising:

one or more additional sequences of neural network layers, wherein each additional sequence of neural network layers is configured to collectively process an input derived from the input image to generate a respective initial output for the input image.

14. A method performed by one or more computers for processing an input image using a convolutional neural network to generate a classification output for the input image, the method comprising:

processing the input image using a first convolutional layer configured to receive the input image and to process the input image to generate a first convolved output;

processing the first convolved output through a first max-pooling operation immediately after the first convolutional layer in the convolutional neural network and configured to pool the first convolved output to generate a first pooled output;

processing a first input derived from the first pooled output using a sequence having only a plurality of second convolutional layers that are after the max-pooling layer in the convolutional neural network and configured to receive a first input derived from the first pooled output and to process the first input to generate a second convolved output;

processing an output derived from the second convolved output using one or more fully-connected layers that are after the sequence of second convolutional layers in the convolutional neural network and configured to receive the output derived from the second convolved output and to collectively process the output derived from the second convolved output to generate an initial output for the input image, and processing at least the initial output using an output layer configured to classify the input image based at least in part on the initial output.

15. The method of claim 14, wherein the one or more fully-connected layers are not immediately after the sequence of second convolutional layers in the convolutional neural network.

16. The method of claim 14, wherein the sequence of second convolutional layers is not immediately followed by a max-pooling layer in the convolutional neural network.

17. The method of claim 14, wherein the convolutional neural network comprises one or more other layers between the sequence of second convolutional layers and the plurality of fully-connected layers.

18. The method of claim 14, wherein the convolutional neural network comprises one or more sets of two or more convolutional neural network layers that each receive a respective same input.

19. The method of claim 14, the convolutional neural network further comprising:

one or more additional sequences of neural network layers.

20. The method of claim 19, wherein each additional sequence of neural network layers is configured to collectively process an input derived from the input image to generate a respective initial output for the input image.

* * * * *